(12) United States Patent
Bly

(10) Patent No.: US 11,354,587 B2
(45) Date of Patent: Jun. 7, 2022

(54) SYSTEMS AND METHODS FOR ORGANIZING AND FINDING DATA

(71) Applicant: System Inc., New York, NY (US)

(72) Inventor: Adam Bly, New York, NY (US)

(73) Assignee: SYSTEM INC., New York, NY (US)

( * ) Notice: Subject to any disclaimer, the term of this patent is extended or adjusted under 35 U.S.C. 154(b) by 644 days.

(21) Appl. No.: 16/421,249

(22) Filed: May 23, 2019

(65) Prior Publication Data

US 2020/0250562 A1    Aug. 6, 2020

Related U.S. Application Data

(60) Provisional application No. 62/799,981, filed on Feb. 1, 2019.

(51) Int. Cl.
*G06F 17/10* (2006.01)
*G06N 7/00* (2006.01)
*G06F 16/2457* (2019.01)
*G06N 20/00* (2019.01)
*G06K 9/62* (2022.01)
*G06F 16/901* (2019.01)

(52) U.S. Cl.
CPC ....... *G06N 7/005* (2013.01); *G06F 16/24578* (2019.01); *G06F 16/9024* (2019.01); *G06K 9/6227* (2013.01); *G06K 9/6267* (2013.01); *G06N 20/00* (2019.01)

(58) Field of Classification Search
CPC .................................................. G06N 7/005
USPC ........................................................ 703/2
See application file for complete search history.

(56) References Cited

U.S. PATENT DOCUMENTS

| | | | |
|---|---|---|---|
| 9,811,438 B1* | 11/2017 | Barrett | G06F 9/4881 |
| 2007/0179354 A1* | 8/2007 | Stupp | G16H 50/70 |
| | | | 128/920 |
| 2012/0089621 A1* | 4/2012 | Liu | G06F 16/335 |
| | | | 707/E17.084 |

(Continued)

FOREIGN PATENT DOCUMENTS

JP    2009217724    9/2009

OTHER PUBLICATIONS

International Searching Authority; Notification of International Search Report & Written Opinion; PCT Application No. PCT/US2020/015871 filed Jan. 30, 2020; dated May 1, 2020; pp. 1-10.

(Continued)

*Primary Examiner* — Timothy A Mudrick
(74) *Attorney, Agent, or Firm* — Fisherbroyles LLP; Alan D. Minsk

(57) ABSTRACT

A system and associated methods for organizing, representing, finding, discovering, and accessing data. Embodiments represent information and data in the form of a data structure termed a "Feature Graph". A Feature Graph includes nodes and edges, where the edges serve to "connect" a node to one or more other nodes. A node in a Feature Graph may represent a variable, that is, a measurable object, characteristic or factor. An edge in a Feature Graph may represent a measure of a statistical association between a node and one or more other nodes that has been retrieved from a source or sources. Datasets that demonstrate or support the statistical association, or measure the associated variable are "linked to" from the Feature Graph.

28 Claims, 7 Drawing Sheets

(56) References Cited

U.S. PATENT DOCUMENTS

2015/0112978 A1* 4/2015 Arora .................. G06F 16/248
                                                                            707/724

OTHER PUBLICATIONS

Ye et al.; "Using node identifiers and community prior for graph-based classification." In: Data Science and Engineering; Mar. 16, 2018; Retrieved Mar. 29, 2020; from <https://link.springer.com/content/pdf/10.1007/s41019-018-0062-8.pdf> pp. 1-16.

Xu et al.; "Discovering user interest on twitter with a modified author-topic model." In: 2011 IEEE/WIC/ACM International Conferences on Web Intelligence and Intelligent Agent Technology; Aug. 27, 2011; Retrieved on Mar. 29, 2020 from <http://www.nlpr.ia.ac.cn/2011papers/gjhy/gh101.pdf>; pp. 1-9.

European Patent Office; European Extended Search Report dated Feb. 25, 2022; EPO Application No. 20747877.7; pp. 1-12 (2022).

* cited by examiner

300

SYSTEMS AND METHODS FOR ORGANIZING AND FINDING DATA

CROSS REFERENCE TO RELATED APPLICATION

This application claims the benefit of U.S. Provisional Application No. 62/799,981, entitled "Systems and Methods for Organizing and Finding Data," filed Feb. 1, 2019, which is incorporated herein by reference in its entirety (including the Appendix) for all purposes.

BACKGROUND

Data is used as part of many learning and decision processes. Such data may be related to topics, entities, concepts, etc. However, in order to be useful, such data must be able to be efficiently discovered, accessed and processed, or otherwise utilized. Further, it is desirable that the data be relevant (or in some cases, sufficiently relevant) to the task being performed or the decision being made. Making a reliable data-driven decision or prediction requires data not just about the desired outcome of a decision or the target of a prediction, but data about the variables (ideally all, but at least the ones most strongly) statistically associated with that outcome or target. Unfortunately, it is very difficult today using conventional approaches to discover which variables have been demonstrated to be statistically associated with an outcome or target and to access data about those variables.

This problem is also present in the case of machine learning, where it is important to identify and construct an appropriate training set for a learning process. However, as recognized by the inventor, sourcing reliable training data is very difficult today in large part because of the conventional way in which information and data are organized.

In many situations, discovery of and access to data is made more efficient by representing data in a particular format or structure. The format or structure may include labels for one or more columns, rows, or fields in a data record. Conventional approaches to identifying and discovering data of interest are typically based on semantically matching words with labels in (or referring to, or about) a dataset. While this method is useful for discovering and accessing data about a topic (a target or an outcome, for example) which may be relevant, it does not address the problem of discovering and accessing data about topics (variables) that cause, affect, predict, or are otherwise statistically associated with a topic of interest.

Embodiments of the inventive system, apparatus, and methods are intended to address and solve these and other problems or disadvantages of conventional solutions for organizing, representing, finding, discovering, and accessing data, both individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Described herein are embodiments of a system and associated methods for organizing, representing, finding, discovering, and accessing data. In some embodiments, information and data are represented in the form of a novel data structure termed a "Feature Graph" (the subject of a pending trademark application; note that "System" is also the subject of a pending trademark application) herein. A Feature Graph is a graph or diagram that includes nodes and edges, where the edges serve to "connect" a node to one or more other nodes. A node in a Feature Graph may represent a variable, that is, a measurable quantity, object, characteristic, feature or factor. An edge in a Feature Graph may represent a measure of a statistical association between a node and one or more other nodes.

The statistical association typically (although in some embodiments, not exclusively) results from performing one or more steps found in the Scientific Method approach to an investigation (typically described as including steps or stages such as (1) making observations, (2) making conjectures (hypotheses), (3) deriving predictions from them as logical consequences, and then (4) carrying out experiments based on those predictions to determine whether the original conjecture was correct). The association is expressed in numerical and/or statistical terms, and may vary from an observed (or possibly anecdotal) relationship, to a measured correlation, to a causal relationship. The information and data used to construct a Feature Graph may be obtained from one or more of a scientific paper, an experiment, a result of a machine learning experiment, human-made or machine-made observations, anecdotal evidence of an association between two variables, etc.

Because of the wide range of statistical association types represented in a Feature Graph and the wide variety of sources of information and/or data used to construct a Feature Graph, mathematical, language-based, and visual methods are employed by embodiments of the system and methods described herein to express the quality, rigor, trustworthiness, reproducibility, reliability, and/or completeness of the information and/or data supporting a given statistical association.

In one embodiment, the invention is directed to a computer-executed method for identifying a relevant dataset for use in training a model related to a topic of interest. The embodiment includes a set of instructions (e.g., software modules or routines) to be executed by a programmed processing element. The method includes accessing a set of sources that include information regarding a statistical association between a topic of a study and one or more variables considered in the study. The information contained in the sources is used to construct a data structure or representation that includes nodes and edges connecting nodes. Edges may be associated with information regarding the statistical association between two nodes. One or more nodes may have a dataset associated with it, with the dataset accessible using a link or other form of address or access element. Embodiments may include functionality that allows a user to describe and execute a search over the data structure to identify datasets that may be relevant to training a machine learning model, with the model being used in making a specific decision or classification.

Other embodiments may be represented by a data structure which includes nodes, edges and links to datasets. The nodes and edges represent concepts, topics of interest, or a topic of a previous study. The edges represent information regarding a statistical association between nodes. Links (or another form of address or access element) provide access to datasets that establish (or support, demonstrate, etc.) a statistical association between one or more variables that were part of a study, or between a variable and a concept or topic.

Other embodiments may include using one or more datasets that are identified using the methods and data structures described herein to train a specific machine learning model. The trained model may then be used to make a decision or "prediction", or to perform a classification of a set of input data. The trained model may be used in signal or image processing, adaptive control systems, sensor systems, etc.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1A:
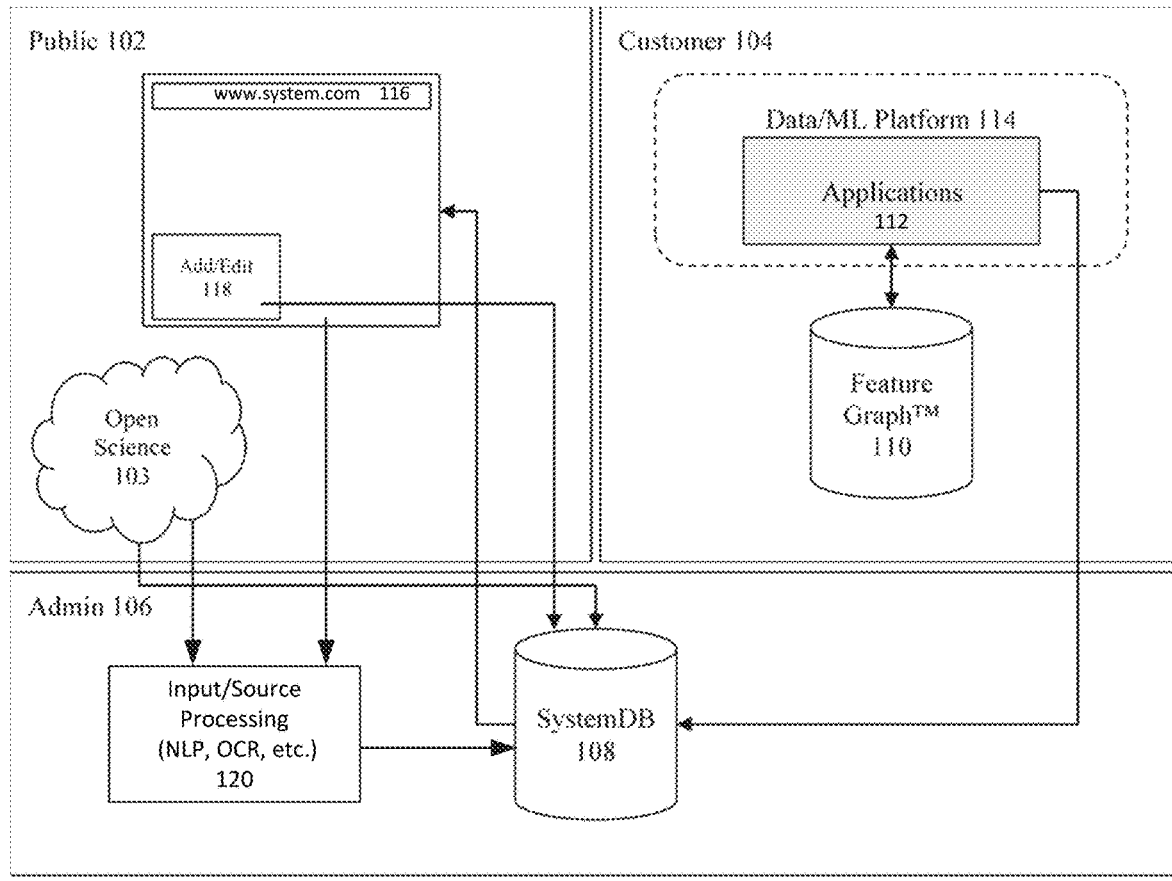
FIG. 1(a) is a block diagram illustrating an architecture that may be used to implement an embodiment of the system and methods described herein.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware-implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, controller, etc.) that is part of a client device, server, network element, or other form of computing or data processing device/platform. The processing element or elements are programmed with a set of executable instructions (e.g., software instructions), where the instructions may be stored in a suitable data storage element.

In some embodiments, one or more of the operations, functions, processes, or methods described herein may be implemented by a specialized form of hardware, such as a programmable gate array (PGA or FPGA), application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

As mentioned, machine learning represents a general case which benefits from use of an embodiment of the systems and methods described. A useful machine learning model is one that generates an output which a user can have enough confidence in to use as the basis for making a decision. To build a successful model, it is necessary to identify and construct an appropriate dataset for training the learning process represented by the model. However, as recognized by the inventor, identifying and accessing training data (sometimes referred to as "sourcing features") is very difficult today in large part because of the conventional way in which information and data are organized.

Further, as also recognized by the inventor, the most relevant, accurate and effective training data would be that data which an empirical (or otherwise reliable) study has shown to be relevant to the decision being made by using the model. For example, if a dataset shows a demonstrable statistical association between one or more variables and an outcome, then presumably that dataset can be relied upon to properly train a model being used to determine if that outcome will occur. Similarly, if a dataset used in a study of a topic does not support a sufficient statistical association, shows none, or does not consider certain variables, then it likely would not be useful for training the model.

Embodiments of the system and methods described herein may include the construction or creation of a graph database. In the context of this description, a graph is a set of objects that are paired together if they have some sort of close or relevant relationship. An example is two pieces of data that represent nodes and that are connected by a path. One node may be connected to many nodes, and many nodes may be connected to a specific node. The path or line connecting a first and a second node or nodes is termed an "edge". An edge may be associated with one or more values; such values may represent a characteristic of the connected nodes, a metric or measure of the relationship between a node or nodes (such as a statistical parameter), etc. A graph format may make it easier to identify certain types of relationships, such as those that are more central to a set of variables or relationships, those that are less significant, etc. Graphs typically occur in two primary types: "undirected", in which the relationship the graph represents is symmetric, and "directed", in which the relationship is not symmetric (in the case of directed graphs, an arrow instead of a line may be used to indicate an aspect of the relationship between the nodes).

In some embodiments, one or more of the operations, functions, processes, or methods described herein may be implemented in whole or in part by a system that retrieves information about statistical associations of varying degree between variables from structured and unstructured sources (along with data or a dataset that substantiates or supports that association), and structures and stores the retrieved information in a data structure that can be used to generate what is termed a "Feature Graph" herein. The Feature Graph represents the topic of a study, the variables examined in the study, the statistical association(s) between a variable and one or more variables and/or between a variable and the topic, and includes a link or other form of access to a set of data (referred to as a dataset) or measurable quantities that provide support for the statistical association(s). The link may also or instead be to datasets that measure the variable in various populations (e.g., Females aged 18 and older; Japan).

In some embodiments, the statistical association(s) are expressed in numerical and/or statistical terms, and may vary in significance from an observed association, to a measured relationship, to a causal relationship. Mathematical, language-based, and visual methods are employed by some embodiments of the system to express the quality, rigor, trustworthiness, reproducibility, and/or completeness of the information and/or data supporting a given statistical or observed association.

For example, a given statistical association might be associated with specific score(s), label(s), and/or icon(s) in a user interface based on its scientific "quality" or reliability (overall and on specific parameters such as "has been peer reviewed") in order to indicate to the user whether or not to investigate the association further. In other embodiments, statistical associations retrieved by searching the Feature Graph may be filtered based on their scientific quality scores. In certain embodiments, the computation of a quality score may combine data stored within the Feature Graph (for example, the statistical significance of a given association or the degree to which the association is documented) with data stored outside the Feature Graph (for example, the number of citations received by the journal article from which the association was retrieved, or the h-index of the author of that article). Note that the Feature Graph is used to represent and access statistically relevant data or information, and therefore such quality measures are more relevant for the use cases described herein than such measures would be if used in conventional knowledge graphs or semantic search results.

As noted, using conventional approaches data is organized to be searchable primarily based on language. For example, this form of organization might be based on metadata about a dataset (e.g., author name), a label of a column, row, or field in a dataset, or a semantic relationship between a user's search input and those data labels (such as equivalence, sufficient similarity, being common synonyms, etc.). This latter approach is the core premise of "knowledge graphs", which represent facts related to topics and the semantic relationships among them. For example, an apple "is a type of" fruit that "is produced in" New York. Employing a knowledge graph, a search for datasets on "apple" could then, in theory, retrieve datasets about other fruit (for example, oranges) or other fruit produced in New York (for example, pumpkins). Data in the public domain and in companies is largely organized based on language and semantic relationships between labels or terms.

As an example of a search based on a knowledge graph, assume that two datasets produced by the State of California Department of Justice contain data about crimes in California in 2017, with one dataset containing data regarding vandalism and the other containing data regarding theft. Conventional data (or "feature," in machine learning terms) search or management platforms based on a knowledge graph would retrieve both datasets in response to a search for one or more of "California," "State of California Department of Justice", and/or "2017" as search terms. Further, a data/feature search or management platform employing a knowledge graph would likely retrieve both datasets with a search for either "vandalism" or "theft" because both terms would be expected to be semantically related to a common category or label of "crime" in the knowledge graph.

Thus, using conventional approaches it is possible to find datasets based on language in or about a dataset (i.e., search terms that "match" a label or metadata), and also to find datasets based on semantic relationships among words in and about datasets and search terms (such as by reference to a general category or label to which others are semantically associated or linked). As a result, if a data scientist knows what topic (or variable(s)) to search for, she can, at least in theory, find potentially relevant data (although this is subject to the assumed completeness of the semantic associations in the knowledge graph).

However, the knowledge graph structure or method of organizing and finding data is inappropriate for some applications, such as predictive modeling and machine learning. This is because in a typical predictive analytics or machine learning task, a data scientist or researcher knows her topic or target (i.e., the end goal, result or object of a study), but not what data (such as factors, variables, or characteristics) will be most useful to predict it or its value (e.g., the presence or absence of some situation). Therefore, the data scientist doesn't know what topic or contributing factor(s) to search for (i.e., those that may be relevant to, or most likely predictive of, the object of the study). This situation makes using a conventional data management platform or knowledge graph approach to identify and access relevant data both inefficient and potentially unreliable. Indeed, it is widely recognized that one of the most challenging parts of implementing machine learning at present is sourcing appropriate training data for a machine learning model.

Conventional approaches to organizing data, and some of their disadvantages are shown in the Table below:

| Solution | Disadvantages |
| --- | --- |
| Master Data Management (MDM) Platform/ Machine Learning Data Catalog/ Feature Store | Datasets/features are retrieved based on language (dataset name, keywords, row or column labels, author name, model ID) or usage metadata, and not the statistical associations between topics measured by the data. This doesn't help in identifying and accessing data for variables predictive of a given target (i.e., a topic or goal of a study). |
| Knowledge Graph | Information is organized based on semantic (rather than statistical) relationships. |
| Dataset Search Engine | Datasets are retrieved based on language (dataset name, keywords, row or column labels, author name, semantic relationships) not the statistical (or other types of) associations between topics measured by the data. This doesn't help access data for variables mathematically associated with a given target or topic of interest. |

FIG. 1 is a block diagram illustrating an architecture 100 that may be used to implement an embodiment of the system and methods described herein. A brief description of the example architecture is provided below:

Architecture

In some embodiments, the architecture elements or components illustrated in FIG. 1 may be distinguished based on their function and/or based on how access is provided to the elements or components. Functionally, the system's architecture 100 distinguishes between:

information/data access and retrieval (illustrated as Applications 112 Add/Edit 118, and Open Science 103)—these are the sources of information and descriptions of experiments, studies, machine learning models, etc. that provide the data, variables, topics, concepts and statistical information that serve as a basis for generating a Feature Graph or similar data structure);

a database (illustrated as SystemDB 108)—an electronic data storage medium or element, and utilizing a suitable data structure or schema and data retrieval protocol/methodology; and applications (illustrated as Applications 112 and website 116)—these are executed in response to instructions or commands received from a public user (Public 102), Customer 104, and/or an Administrator 106. The applications may perform one or more useful operations or functions, such as:

searching SystemDB 108 or a Feature Graph 110 and retrieving variables, datasets and other information of relevance to a user query;

identifying specific nodes or relationships of a Feature Graph;

writing data to SystemDB 108 so that the data may be accessed by the Public 102 or others outside of the Customer or business 104 that owns or controls access to the data (note that in this sense, the Customer 104 is serving as an element of the information/data retrieval architecture/sources);

generating a Feature Graph from specified datasets;

characterizing a specific Feature Graph according to one or more metrics or measures of complexity, relative degree of statistical significance, etc.; and/or getting recommendations for datasets to use in training a machine learning model.

Figure 2A:
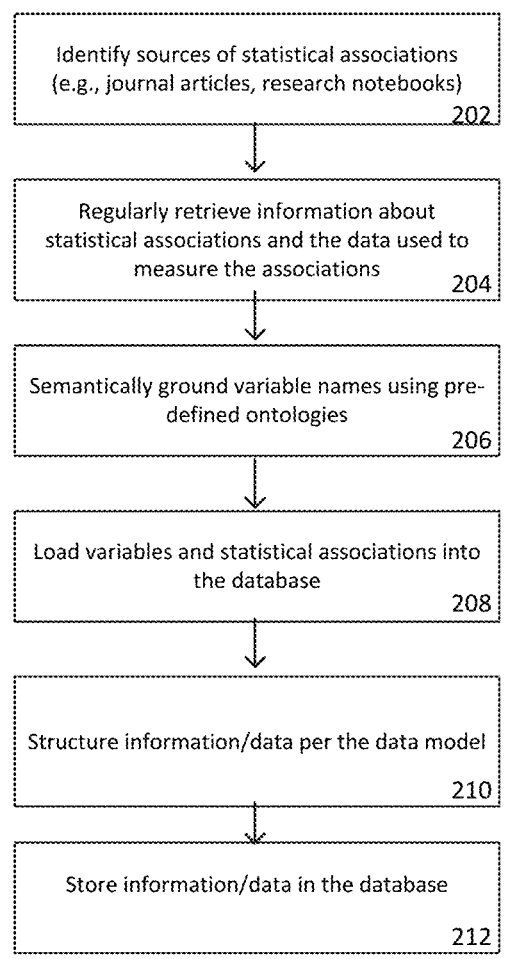
FIG. 2(a) is a flow chart or flow diagram illustrating a process, method, function or operation for constructing a Feature Graph (from data contained in a central database or "SystemDB", which may provide data used in multiple Feature Graphs and is the central instance of a Feature Graph) using an implementation of an embodiment of the systems and methods described herein.

From the perspective of access to the system and its capabilities, the system's architecture distinguishes between elements or components accessible to the public 102, elements or components accessible to a defined customer, business, organization or set of businesses or organizations (such as an industry consortium or "data collaborative" in the social sector) 104, and elements or components accessible to an administrator of the system 106;

Information/data about or demonstrating statistical associations between topics, factors, or variables may be retrieved (i.e., accessed and obtained) from a number of sources. These may include (but are not limited to) journal articles, technical and scientific publications and databases, digital "notebooks" for research and data science, experimentation platforms (for example for A/B testing), data science and machine learning platforms, and/or a public website (element/website 116) where users can input observed statistical (or anecdotal) relationships between observed variables and topics, concepts or goals;

For example, using natural language processing (NLP), natural language understanding (NLU), and/or computer vision for processing images (as illustrated by Input/Source Processing element 120), components of the information/data retrieval architecture may scan (such as by using optical character recognition, OCR) or "read" published or otherwise accessible scientific journal articles and identify words and/or images that indicate a statistical association has been measured (for example, by recognizing the term "increases" or another relevant term or description), and in response, retrieve information/data about the association and about datasets that measure (e.g., provide support for) the association (as suggested by the element labeled "Open Science" 103 in the figure and by step or stage 202 of FIG. 2(a));

Other components of the information/data retrieval architecture (not shown) may provide users with a way to input code into their digital "notebook" (e.g., Jupyter Notebook) to retrieve the metadata output of a machine learning experiment (e.g., the "feature importance" measurements of the features used in a given model) and information about datasets used in the experiment;

Note that in some embodiments, information/data retrieval is generally happening on a regular or continuing basis, providing the system with new information to store and structure and thereby expose to users;

In some embodiments, algorithms/model types (e.g., Logistic Regression), model parameters, numerical values (e.g., 0.725), units (e.g., log loss), statistical properties (e.g., p-value=0.03), feature importance, feature rank, model performance (e.g., AUC score), and other statistical values regarding an association are identified and stored as retrieved;

Given that researchers and data scientists may employ different words to describe the same or a closely similar concept, variable names (e.g., "aerobic exercise") are stored as retrieved and may then be semantically grounded to (i.e., linked or associated with) public domain ontologies (e.g., Wikidata) to facilitate clustering of variables (and the associated statistical association) based on common or typically synonymous or closely related terms and concepts;

For example, a variable labeled as "log_house_sale_price" by a given user might be semantically associated by the system (and further affirmed by the user) with "Real Estate Price," a topic in Wikidata with the unique ID, Q58081362;

A central database ("SystemDB" 108) stores the information/data that has been retrieved and its associated data structures (i.e., nodes, edges, values), as described herein. An instance or projection of the central database containing all or a subset of the information/data stored in SystemDB is made available to a defined customer, business or organization 104 (or group thereof) for their own use (e.g., in the form of a "Feature Graph" 110);

Because access to a particular Feature Graph may be restricted to certain individuals associated with a given business or organization, it may be used to represent information/data about variables and statistical associations that may be considered private or proprietary to the given business or organization 104 (such as employment data, financial data, product development data, R&D data, etc.);

Each customer/user has their own instance of SystemDB in the form of a Feature Graph. All Feature Graphs read data from SystemDB concurrently and in most cases frequently, ensuring that users of a Feature Graph have the most up to date knowledge stored in SystemDB;

Applications 112 may be developed ("built") on top of the Feature Graph 110; some applications may read data from it, some may write to it, and some may do both. An example of an application is a recommender system for datasets (referred to as a "Data Recommender" herein), which will be described in greater detail. A customer 104 using the Feature Graph 110 can use a suitable application 112 to "write" information/data to SystemDB 108 should they wish to share certain information/data with a broader group of users outside their organization or with the public;

An Application 112 may be integrated with a Customer's 104 data platform and/or machine learning (ML) platform 114. An example of a data platform is Google Cloud Storage. An ML (or data science) platform could include software such as Jupyter Notebook;

Such a data platform integration would, for example, allow a user to access a feature recommended by a Data Recommender application in the customer's data storage or other data repository. As another example, a data science/ML platform integration would, for example, allow a user to query the Feature Graph from within a notebook;

Note that in addition to, or instead of such integration with a Customer's data platform and/or machine learning (ML) platform, access to an application may be provided by the Administrator to a Customer using a suitable service platform architecture, such as Software-as-a-Service (SaaS) or similar multi-tenant architecture. A further description of the primary elements or features of such an architecture is described herein with reference to FIG. 5.

In some embodiments, a web-based application may be made accessible to the Public 102. On a website (such as "System.com" 116), a user could be enabled to read from and write to SystemDB 108 (as suggested by the Add/Edit functionality 118 in the figure) in a manner similar to that experienced with a website such as Wikipedia; and In some embodiments, data stored in SystemDB 108 and exposed to the public on System.com 116 may be made freely available to the public in a manner similar to that experienced with a website such as Wikipedia.

Figure 1B:
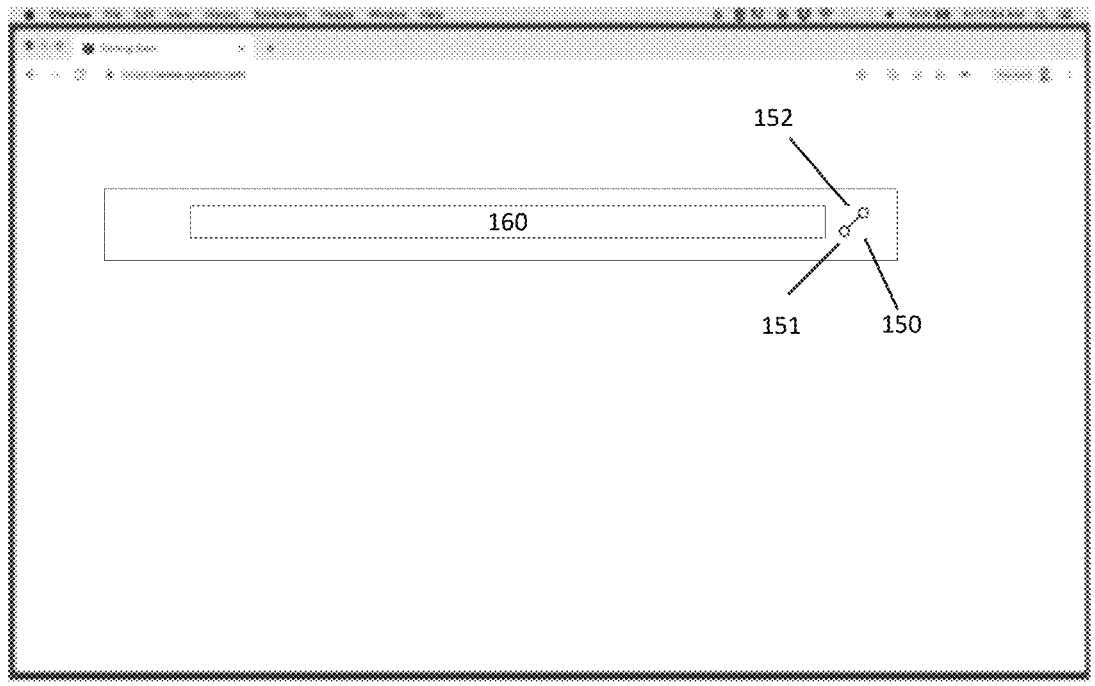
FIG. 1(b) is a screenshot illustrating a user interface icon that may be used in an implementation of an embodiment of the system and methods described herein to more easily enable a user to control a search and to identify a location into which to insert a search query.
Figure 1C:
FIG. 1(c) is a diagram illustrating a user interface icon that may be used for a standard or conventional semantic search.
Figure 1D:
FIG. 1(d) is a diagram illustrating a user interface icon that may be used for a statistical search for the same search input as illustrated in FIG. 1(c)

FIG. 1(b) is a screenshot illustrating a user interface icon 150 (also shown in FIG. 1(d)) that may be used in an implementation of an embodiment of the system and methods described herein to differentiate a Statistical Search (the name or label given by the inventor to the type of search described herein), to more easily enable a user to trigger and control a Statistical Search, and to identify a location (the outlined query input "box") into which to insert a Statistical Search query 160.

Note that in contrast to the search bar plus magnifying glass icon that, for example, Google and other popular search engines use to visually signal the depth of the search they provide (as shown in FIG. 1(c)), an embodiment may instead employ a "micro-graph" 150 comprising two nodes and one edge connecting the nodes, signaling to the user that a Statistical Search is implemented in a broader sense (i.e., looking for statistical associations) than a standard semantic search, and giving the user control over aspects of the search. By selecting the source node 151, the target node 152, or both nodes, a user may specify her intent with respect to traversal of a Feature Graph. For example:

by selecting the lower of the nodes 151, a user may specify her interest in knowing what the search input is related to, what it predicts, and what is caused by it;

by selecting the higher of the nodes 152 a user may specify her interest in knowing what predicts or causes the search input; or by selecting both nodes 151 and 152, a user may specify her interest in knowing how more than 1 search inputs are related.

In operation, a user's selection of one or both nodes in the user interface element filters the Statistical Search results for associations upstream from the search input (input as target), downstream from the search input (input as source), or for paths (and the related variables) that link two inputs.

As indicated by the description of FIG. 1(b) and other information in this application, there is a fundamental difference between a standard semantic search and a "statistical search" as described herein. The ability to perform and present results of a statistical search is one of the benefits and advantages of the system and methods described herein by enabling users to retrieve one or more variables that are statistically associated with their input. Such a search process is only possible with a Feature Graph data structure.

A conventional search, employing semantic relations, would have the following characteristics:

Input: Variable or Concept

Output: All nodes that match or are semantically related to the Input, filterable by user-specified type (e.g., Datasets).

Example:
Input=Smoker
Output=Smoking, Smokers, Cigarettes, etc.
The search bar or user input appears as shown in FIG. 1(c).
In contrast, a statistical search as implemented by an embodiment of the system and methods described herein has the following characteristics:
Input: Variable or Concept
Output: Variables and/or concepts statistically associated to the Input, filterable by user-specified type (e.g., Datasets).
Example:
Input=Smoker
Output=High Blood Pressure, Weekly Earnings, Gender is Male, etc.
The search bar or user input appears as shown in FIG. 1(d). Furthermore, the ranking of the output results may take into account the value and quality of the association.

Figure 2B:
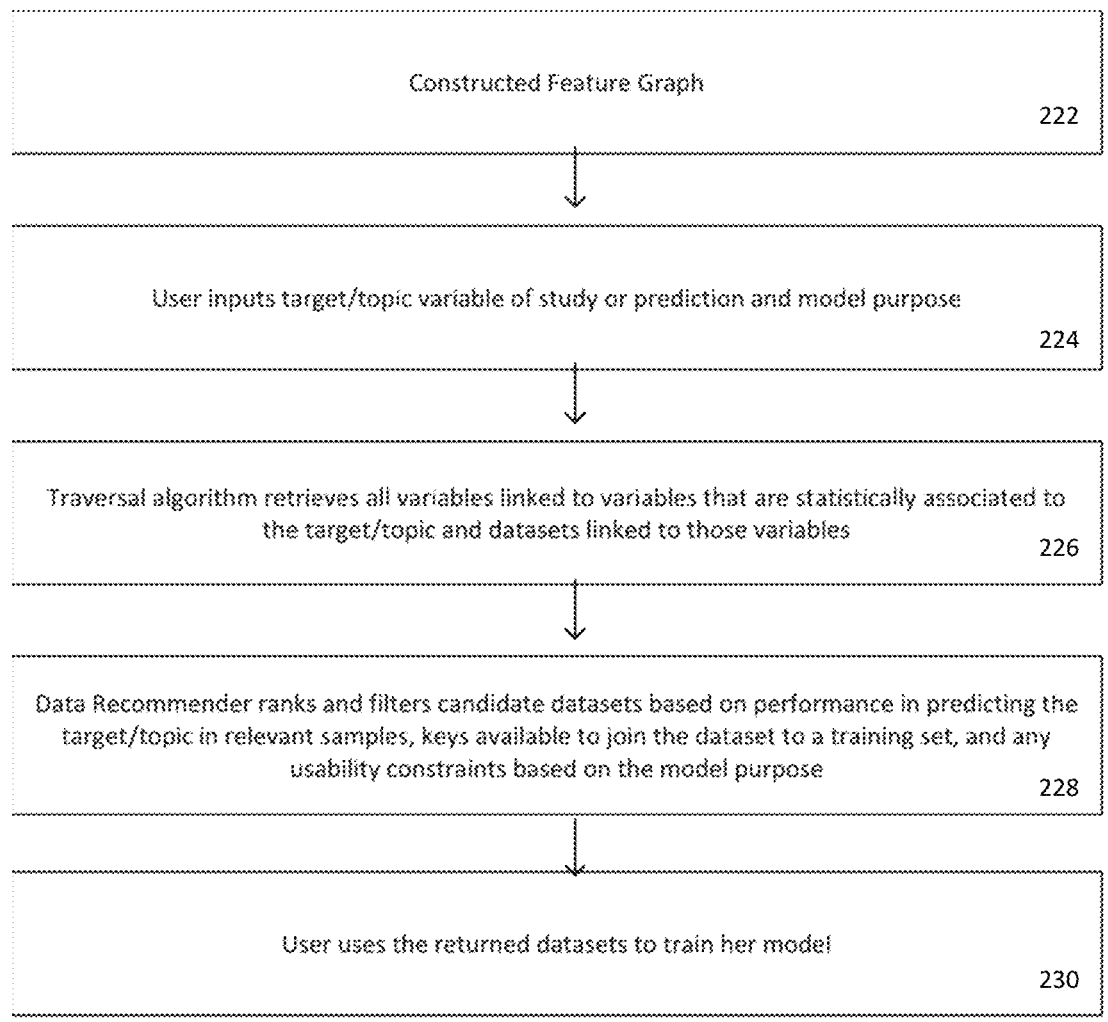
FIG. 2(b) is a flow chart or flow diagram illustrating a process, method, function or operation for an example use case in which a Feature Graph is traversed in order to identify potentially relevant datasets, and which may be implemented in an embodiment of the systems and methods described herein.

FIG. 2(a) is a flow chart or flow diagram illustrating a process, method, function or operation for constructing a Feature Graph 200 using an implementation of an embodiment of the systems and methods described herein. FIG. 2(b) is a flow chart or flow diagram illustrating a process, method, function or operation for an example use case in which a Feature Graph is traversed in order to identify potentially relevant datasets 220, and which may be implemented in an embodiment of the systems and methods described herein.

As shown in the figures (specifically, FIG. 2(a)), a Feature Graph is constructed or created by identifying and accessing a set of sources that contain information and data regarding statistical associations between variables or factors used in a study (as suggested by step or stage 202). This type of information may be retrieved on a regular or continuing basis to provide information regarding variables, statistical associations and the data used to support those associations (as suggested by 204). As noted, this information and data is processed to identify variables used or described in those sources, and also the statistical associations between one or more of those variables and one or more other of the variables.

Continuing with FIG. 2(a), at 202 sources of data/information are accessed. The accessed data/information is processed to identify variables and statistical associations found in the source or sources 204. As described, such processing may include image processing (such as OCR), natural language processing (NLP), natural language understanding (NLU), or other forms of analysis that assist in understanding the contents of a journal paper, research notebook, experiment log, or other record of a study.

Further processing may include linking certain of the variables to an ontology (e.g., International Classification of Diseases) or other set of data that provides semantic equivalents or semantically similar terms to those used for the variables (as suggested by step or stage 206). This assists in expanding the variable names used in a specific study to a larger set of substantially equivalent or similar entities or concepts that may have been used in other studies. Once identified, the variables (which, as noted may be known by different names or labels) and statistical associations are stored in a database (208), for example SystemDB 108 of FIG. 1. The results of processing the accessed information and data are then structured or represented in accordance with a specific data model (as suggested by step or stage 210); this model will be described in greater detail herein, but it generally includes the elements used to construct a Feature Graph (i.e., nodes representing a topic or variable, edges representing a statistical association, measures including a metric or evaluation of a statistical association). The data model is then stored in the database (212); it may be accessed to construct or create a Feature Graph for a specific user or set of users.

Figure 3:
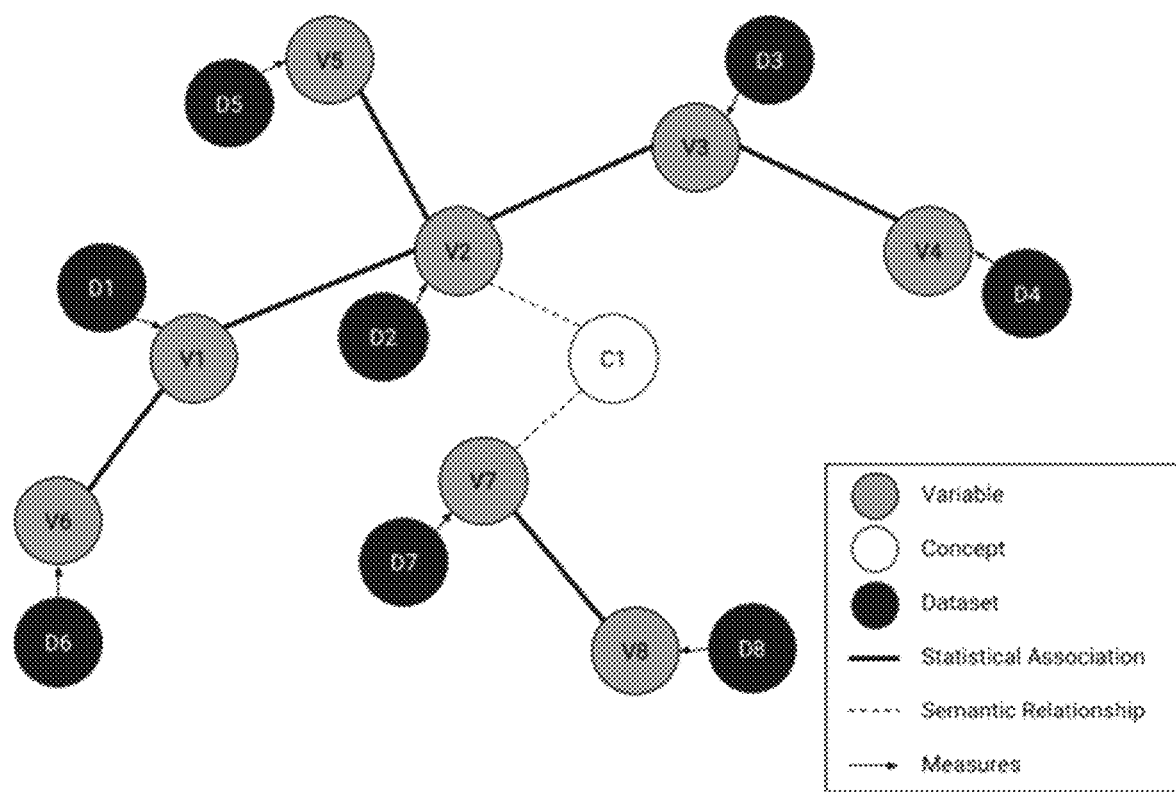
FIG. 3 is a diagram illustrating an example of part of a Feature Graph data structure that may be used to organize and access data and information, and which may be created using an implementation of an embodiment of the system and methods described herein.

As noted, the process or operations described with reference to FIG. 2(a) enable the construction of a graph containing nodes and edges linking certain of the nodes (an example of which is illustrated in FIG. 3). The nodes represent topics, targets or variables of a study or observation and the edges represent a statistical association between a node and one or more other nodes. Each statistical association may be associated with one or more of a numerical value, model type or algorithm, and statistical properties that describe the strength, confidence or reliability of a statistical association between the nodes (variables, factors or topics) connected by the edge. Note that the numerical value, model type or algorithm, and the statistical properties associated with the edge may be indicative of a correlation, a predictive relationship, a cause and effect relationship, an anecdotal observation, etc.

Once information and data are accessed and processed for storage in a database (such as SystemDB, which may contain both unprocessed data and information, processed data and information, and data and information stored in the form of a data model), a Feature Graph that contains a specified set of variables, topics, targets, or factors may be constructed. The Feature Graph for a particular user may include all of the data and information in SystemDB or a subset thereof. For example, the Feature Graph (110 in FIG. 1) for a specific Customer 104 may be constructed based on selecting data and information from SystemDB 110 that satisfy conditions such as the applicability of a given domain (e.g., public health) in SystemDB to the domain of concern of a customer (e.g., media);

note that in deploying/generating/constructing a Feature Graph for a specific customer or user, data in SystemDB may be filtered in order to improve performance by removing data that would not be relevant to the problem or concept/topic being investigated.

The Table below provides a summary of certain differences between a Feature Graph and a Knowledge Graph:

|  | Knowledge Graph | Feature Graph |
| --- | --- | --- |
| Primary Node | Topics (people, places, things, etc.) | Variables (measurable empirical objects) |
| Primary Edge | Semantic Relationship (retrieved from facts and taxonomies) | Statistical Association (retrieved from experiments, measurements, observations) |

After constructing a Feature Graph for a specific user or set of users, the graph may be traversed to identify variables of interest to a topic or goal of a study, model or investigation, and if desired, to retrieve the datasets that support or confirm the relevance of those variables or that measure variables of interest. Note that the process by which a Feature Graph is traversed may be controlled by one of two methods: (a) explicit user tuning of the search parameters or (b) algorithmic based tuning of the parameters for variable/data retrieval. For example, in the use cases described in the section of this application entitled "Other use cases or environments in which the inventive process would have value", user tuning would typically be utilized, while in use cases in which a Data Recommender application was used, algorithmic tuning would typically be utilized.

For example, and as shown in FIG. 2(b), a constructed or created Feature Graph (222) may be traversed to identify datasets of potential value to a specific investigation, topic, study or analysis. In the example process illustrated in the Figure, a user may input factors to be used as part of defining the search query (step or stage 224). These factors may include a Target/Topic, Variable or Factor of interest (for example, "housing prices") and a parameter of the model being constructed (for example, joinable to the key "census tract" and measured in population "Chicago, 2017"). A Data Recommender application (such as 112 in FIG. 1) then traverses the Feature Graph to identify datasets that are expected to be of relevance and useful to training the model (step or stage 226). The identified datasets may then be ranked, filtered or otherwise ordered (step or stage 228, which will be described in greater detail) prior to presentation to a user (step or stage 230).

FIG. 3 is a diagram illustrating an example of part of a Feature Graph data structure 300 that may be used to organize and access data and information, and which may be created using an implementation of an embodiment of the system and methods described herein. A description of the elements or components of the Feature Graph 300 and the associated Data Model implemented is provided below.

Feature Graph

As noted, a Feature Graph is a way to structure, represent, and store statistical associations between topics and their associated variables, factors, categories, etc. The core elements or components (i.e., the "building blocks") of a Feature Graph are variables (identified as V1, V2, etc. in FIG. 3) and statistical associations (identified as connecting lines or edges between variables). Variables may be linked to or associated with a "concept" (identified as C1 in the figure), which is a sematic concept or topic that is not, in and of itself, necessarily measurable (for example, the variable "number of robberies" may be linked to the concept "crime"). Variables are measurable empirical objects or factors. In statistics, an association is defined as "any statistical relationship, whether causal or not, between two random variables." Statistical associations result from one or more steps or stages of what is termed the Scientific Method, and may, for example, be characterized as weak, strong, observed, measured, correlative, causal, predictive, etc.;

As an example and with reference to FIG. 3, a statistical search for input variable V1 retrieves: (i) variables statistically associated with V1 (e.g., V6, V2) (in some embodiments, a variable may only be retrieved if a statistical association value is above a defined threshold), (ii) variables statistically associated with those variables (e.g., V5, V3, V4) (in some embodiments, a variable may only be retrieved if a statistical association value is above a defined threshold), (iii) variables semantically related by a common concept (e.g., C1) to a variable or variables (e.g., V2) that are statistically associated to the input variable V1 (e.g., V7), (iv) variables statistically associated to those variables (e.g., V8); and the datasets measuring the associated variables or demonstrating the statistical association of the retrieved variables (e.g., D6, D2, D5, D3, D4, D7, D8);

note that in contrast, a semantic search for input variable V1 retrieves only: (1) the variable V1, and (2) the dataset(s) measuring that variable (e.g., D1);

A Feature Graph is populated with information/data about statistical associations retrieved from (for example) journal articles, scientific and technical databases, digital "notebooks" for research and data science, experiment logs, data science and machine learning platforms, a public website where users can input observed or perceived statistical associations, and other possible sources;

As noted, using natural language processing (NLP), natural language understanding (NLU), and/or image processing (OCR, visual recognition) techniques, components of the information/data retrieval architecture can scan or "read" published scientific journal articles, identify words or images that indicate that a statistical association has been measured (for example, "increases"), and retrieve information/data about the association and about datasets that measure/confirm the association;

Other components of the information/data retrieval architecture provide data scientists and researchers with a way to input code into their digital "notebook" (e.g., Jupyter Notebook) to retrieve the metadata output of a machine learning experiment (e.g., the "feature importance" measurements of features used in a given model) and information about datasets used in the experiment. Note that information/data retrieval is happening regularly and, in some cases, continuously, providing the system with new information to store and structure and expose to users;

In one embodiment, datasets are associated to variables in a Feature Graph with links to the URI of the relevant dataset/bucket/pipeline (for example, the UCI Census Income Dataset is located at https://archive.ics.uci.edu/ml/machine-learning-databases/adult/_), or another form of access or address;

This allows a user of the Feature Graph to retrieve datasets based on the previously demonstrated or determined predictive power of that data with regards to a specified target/topic (rather than the potentially less relevant or irrelevant datasets about topics semantically related to a specified target/topic, as in a knowledge graph);

For example, using an embodiment of the system and methods described herein, if a data scientist searches for "vandalism" as a target topic or goal of a study, they will retrieve datasets for topics that have been shown to predict that target/topic—for example, "household income," "luminosity," and "traffic density" (and the evidence of those statistical associations to the target)—rather than datasets measuring instances of vandalism;

Numerical values (e.g., 0.725) and statistical properties (e.g., p-value=0.03) of an association are stored in SystemDB (or a constructed Feature Graph) as retrieved. As noted, given that researchers and data scientists may employ different words to describe the same concept, variables names (e.g., "aerobic exercise") are stored as retrieved and are semantically grounded to public domain ontologies (e.g., Wikidata) to facilitate clustering of variables (and the statistical associations) based on common or similar concepts (such as synonymous terms);

The system employs mathematical, language-based, and visual methods to express the epistemological properties of the evidence recorded, for example the quality, rigor, trustworthiness, reproducibility, and completeness of the information and/or data supporting a given statistical association;

For example, a given statistical association might carry specific score(s), label(s), and/or icon(s) in a user interface based on its scientific quality (overall and with regards to specific parameters such as "has been peer reviewed") in order to indicate to the user at a glance whether or not to investigate the association further. In some embodiments, statistical associations retrieved by searching the Feature Graph are filtered based on their scientific quality scores. In certain embodiments, the computation of quality scores may combine data stored within the Feature Graph (for example, the statistical significance of a given association or the degree to which the association is documented) with data stored outside the Feature Graph (for example, the number of citations received by the journal article from which the association was retrieved, or the h-index of the author of that article);

For example, a statistical association with a high and significant "feature importance" score measured in a model with a high area under the curve (AUC) score, with a partial dependence plot (PDP), and that is documented for reproducibility might be considered a "strong" statistical association in the Feature Graph and given an identifying color or icon in a graphical user interface;

Note that in addition to retrieving variables and statistical associations, an embodiment may also retrieve the other variables used in an experiment to contextualize a statistical association for a user. This may be helpful if, for example, a user wants to know if certain variables were controlled for in an experiment or what other variables (or features) are included in a model.

Data Model

The primary objects in a Feature Graph (or SystemDB) will typically include one or more of the following:

Variable (or Feature)—What are you measuring and in what population?
Concept—What is the topic or concept you are studying?
Neighborhood—What is the subject you are measuring?
Statistical Association—What is the mathematical basis for and value of the relationship?
Model (or Experiment)—What is the source of the measurement?
Dataset—What is the dataset that was used to measure a relationship (e.g., a training set) or that measures a variable?

These objects are related in a Feature Graph as follows (as illustrated in FIG. 3):

Variables are linked to other Variables via Statistical Associations;
Statistical Associations result from Models and are supported by Datasets; and
Variables are linked to Concepts and Concepts are linked to Neighborhoods.

For example, the variable "skin problems in grades 7-12" may be linked in a Feature Graph (and in SystemDB, the central database) to the variable "personal earnings" based on a linear probability model, with an association value of 0.126, standard error of 0.047, significance level of 0.1, in a sample of women in the United States measured in 1994-1995 for the first variable and in 2007-2008 for the second variable, run by Mialon, Hugo M. and Nesson, Erik, published in DOI:10.2139/ssm.2964045 (Do Pimples Pay? Acne, Human Capital, and the Labor Market) and substantiated with a dataset located at https://www.cpc.unc.edu/projects/addhealth/documentation/publicdata. The variable "skin problems in grades 7-12" may additionally be semantically grounded/linked to the concept "Acne vulgaris" and the variable "personal earnings" may be semantically grounded to the concept "Personal Income", with both concept names sourced from an ontology such as Wikidata.

Referring to FIGS. 2(b) and 3, as noted, one use of a Feature Graph is to enable a user to search a Feature Graph for one or more datasets that contain variables that have been shown to be statistically associated with a target topic, variable or concept of a study. As an example:

A user inputs a target variable and wants to retrieve all the datasets that could be used to train a model to predict that target variable, i.e., those that are linked to variables statistically associated with the target variable (as suggested by 224 in FIG. 2(b));

For example, and with reference to FIG. 3, a statistical search input V1 causes an algorithm (for example, breadth-first search (BFS)) to traverse the graph and return: (i) variables statistically associated with V1 (e.g., V6, V2) (in some embodiments, a variable may only be retrieved if a statistical association value is above a defined threshold), (ii) variables statistically associated with those variables (e.g., V5, V3, V4) (in some embodiments, a variable may only be retrieved if a statistical association value is above a defined threshold), (iii) variables semantically related by a common concept (e.g., C1) to a variable or variables (e.g., V2) that are statistically associated to the input variable V1 (e.g., V7), (iv) variables statistically associated to those variables (e.g., V8); and the datasets measuring or demonstrating the statistical significance of the retrieved variables (e.g., D6, D2, D5, D3, D4, D7, D8);

After traversing the Feature Graph and retrieving potentially relevant datasets, those datasets may be "filtered", ranked or otherwise ordered based on the application or use case:

Datasets retrieved through the traversal process described above may be subsequently filtered based on criteria input by the user with their search and/or by an administrator of an instance of the software. Example search dataset filters may include one or more of:

Population and Key: Is the variable of concern measured in the population and key of interest to the user (e.g., a unique identifier of a user, species, city, company, etc.)? This impacts the user's ability to join the data to a training set for machine learning;
Compliance: Does the dataset meet applicable regulatory considerations (e.g., GDPR compliance)?
Interpretability/Explainability: Is the variable interpretable by a human?
Actionable: Is the variable actionable by the user of the model?

In one embodiment, a user may input a concept (represented by C1 in FIG. 3) such as "crime", "wealth", "hypertension", etc. In response, the system and methods described herein may identify the following by using a combination of semantic and/or statistical search techniques:

A concept (C2) that is semantically associated with C1 (note that this step may be optional);

Variables ($V_X$) that are semantically associated with C1 and/or C2;

Variables that are statistically associated with each of the variables $V_X$;

A measure or measure of the identified statistical association; and

Datasets that measure each of the variables $V_X$ and/or that demonstrate or support the statistical association of the variables that are statistically associated with each of the variables $V_X$.

In some embodiments of the system and methods described herein, multiple edges (statistical associations) will link a given pair of nodes (variables, factors or concepts), indicating multiple pieces of evidence regarding a statistical association between the given node pair. Given the breadth of sources the system may retrieve information from and the evolving nature of science and technology, it is also conceivable that this group of edges will contain or represent a range of association values (and/or relationships).

In such cases, the system will "read" the relevant information in the database and generate additional edges (termed "Summary Associations") representing statistical and epistemological summaries of the information (for example, the distribution of values, the degree of consensus about the nature and strength of the association, the populations where an association has been measured, etc.). Note that Summary Association edges can be retrieved by applications, for example to provide a user with a "bird's-eye view" of a given domain of interest, and answer questions about the consensus around a particular set of statistical associations, how a particular set of statistical associations has changed over time, and what has or has not been studied in what populations.

Recommendation of Datasets

In some embodiments, a Data Recommender application may be used to leverage the benefits of a Feature Graph. In a typical use case, a user (a data scientist), inputs a desired target or topic (a "Target") and model purpose, and the Data Recommender retrieves the "best" datasets for her to use for training the model. In one embodiment, the Data Recommender algorithm/process traverses the Feature Graph, ranks the most predictive relationships based on the statistical information and metadata stored in the Feature Graph, filters the results based on certain data usability factors (e.g., keys required for data joins) and/or based on the specified purpose of the model (for example, the model requires interpretable/explainable features, or the model must not use protected class information, etc.), and then returns one or more datasets (and variables without available or usable datasets) to the user.

In contrast to a Statistical Search of a Feature Graph where a user controls key parameters of the retrieval of variables and datasets (for example, a minimum association strength or metadata quality), a Data Recommender application may perform the parameter tuning work for the user and return variables and datasets that are expected to be of highest relevance to the user. To produce a dataset recommendation, the application may take into account a number of characteristics or signals, including, for example:

Hops to Target: Evidence of a direct association between a Variable and the Target is of greater weight than evidence of an indirect association between a Variable and another Variable that is directly associated to the Target;

Semantic Relevance: Variables retrieved by traversing through a Concept should be semantically relevant to that Concept. Strong relevance should be weighted more highly than weak relevance;

Causality: Variables associated via causal relationships with the Target are of greater weight than Variables associated via non-causal relationships;

Model Accuracy: Variables associated via more accurate models are of greater weight than Variables associated via less accurate models; and/or Feature Importance: Variables that have relatively high and/or significant Feature Importance in the model from which an association was sourced are of greater weight than Variables with a lower and/or insignificant Feature Importance.

Other Potential Uses of an Embodiment of the Inventive System and Processes

The inventor envisions users further leveraging SystemDB to provide context to readers and viewers of content on the Internet. For example, a news website could link a concept or variable referenced in an article to the associated object in SystemDB and retrieve (via an API) a graph that could be embedded in the news article, thereby providing readers with context about the known statistical associations to the concept or variable referenced in the article.

The inventor also envisions users leveraging the Feature Graph in an organization to facilitate knowledge sharing and collaboration among data scientists about the performance of various ML (machine learning) models and features. The inventor also envisions users leveraging the Feature Graph in an organization to document ML experiments and models.

The inventor also envisions users leveraging the Feature Graph in an organization to maintain a central dictionary of variable terms (or labels), topic terms, concept terms, key terms, and other concepts necessary for data science. This dictionary would be referenced by the Feature Graph when, for example, a user creates a new variable, in order to encourage common naming of common entities/objects.

The inventor also envisions users leveraging the Feature Graph in organizations to encourage non-technical employees to share their observations and hypotheses about statistical associations that impact their system. For example, a manager might have anecdotal evidence that a variable exogenous to the company influences the price of a certain commodity in their supply chain and submits that observation to the Feature Graph as an "unverified" statistical association for the company's data scientists to study.

The inventor also envisions users further leveraging the Feature Graph in large governmental and non-governmental organizations to inform how they organize teams and resources, and to conduct strategic planning. For example, by referencing their Feature Graph, an organization may recognize certain relationships between key business variables or metrics and align teams or projects to improve that metric in a more systematic fashion.

The inventor also envisions users leveraging SystemDB for understanding, modeling, and visualizing the world, or parts of the world, as a complex system. For example, through data visualization applications, virtual reality or augmented reality applications, or immersive installations, a general user could navigate the complex interdependencies within a particular neighborhood of SystemDB. Or, for example, by leveraging the multitude of statistical associations in a given neighborhood, a technical user could study and model the dynamics of a particular system and compare those dynamics across various populations.

The inventor also envisions users leveraging SystemDB or the Feature Graph for performing network science on a given subgraph and for link prediction. For example, an application could be created that allows a technical user to select certain forms of statistical associations, generate a subgraph containing those associations in a specific domain, and then measure network science properties such as centrality (for example, to understand the centrality of variables in a public health system). As another example, the user could leverage the information and data in the Feature Graph about the edges linked to a given node to predict edges for a similar node:

in this use case, a user could leverage the knowledge contained in a Feature Graph about the associations between a variable A and other variables in a given population to make predictions about the associations between a certain variable B that is materially similar to variable A (where such materiality may be determined by a priori knowledge about the nature of the variables in question, e.g. the shape of a molecule and the relevance to its impact on the body).

The inventor also envisions users leveraging SystemDB or the Feature Graph for inferring causal relationships, where a key challenge is identifying potential confounders. It is the contention of the inventor that the technical process of causal inference at large scale would be significantly improved through collective intelligence, that is, specifically by leveraging the unprecedented volume, richness, and diversity of associations contained in SystemDB that are sourced from a diversity of experiments and studies, across various populations, and contributed by different users.

The inventor also envisions users leveraging SystemDB and the Feature Graph for simulating possible consequences of particular events, decisions, and actions. For example, applications could be built on top of SystemDB that allow a user to define a certain set of conditions for a set of variables and simulate the possible impact on other variables.

The inventor also envisions users leveraging SystemDB and the Feature Graph for guiding investment decisions. For example, a user may use SystemDB to consider the unintended consequences of a particular financial event (for example, a change in the price of a given commodity) to hedge an investment.

The inventor also envisions users leveraging SystemDB and the Feature Graph as training data for artificial general intelligence (AGI). For example, SystemDB could be used to train AIs about known statistical associations in the world.

Figure 4:
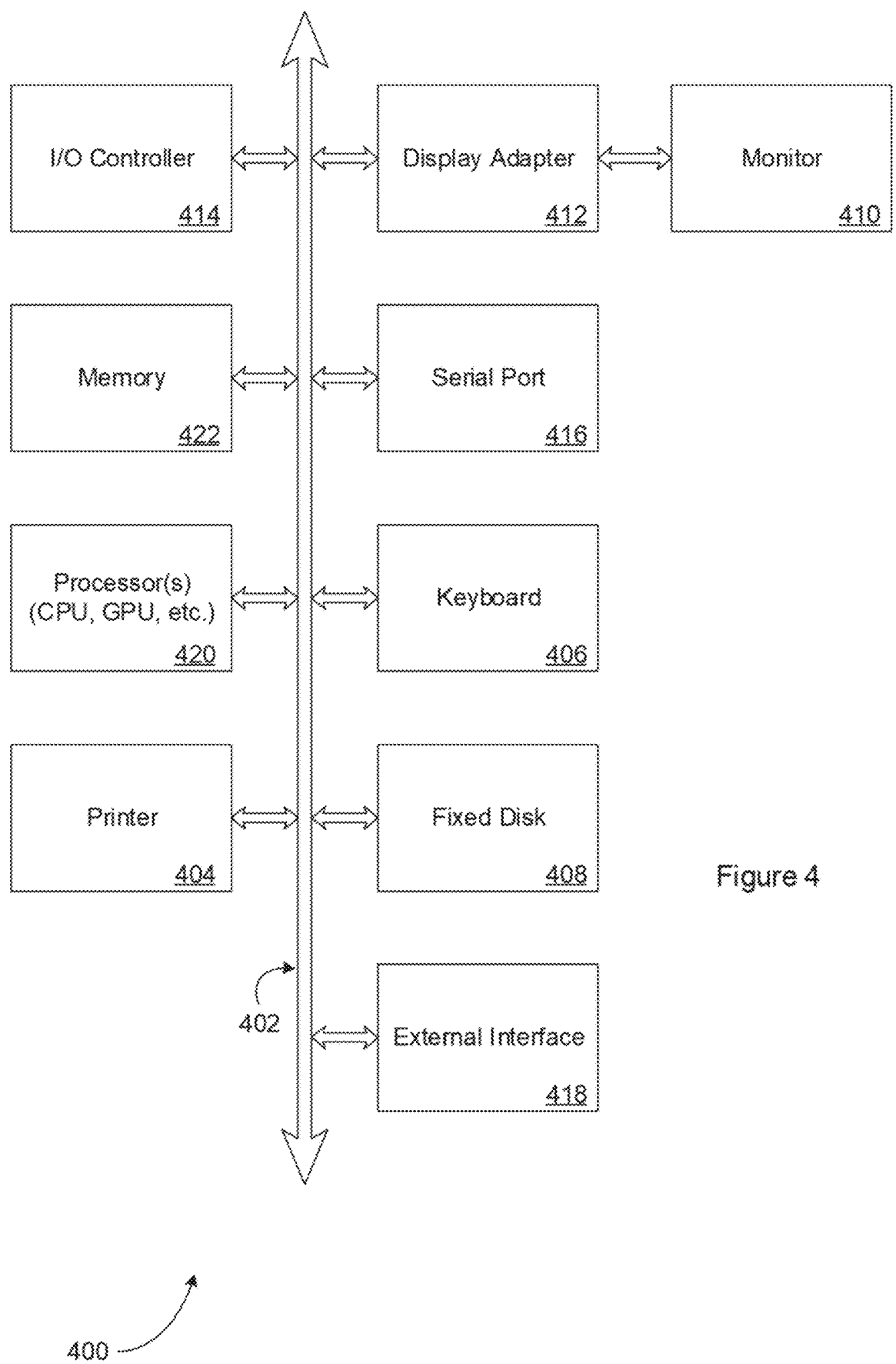
FIG. 4 is a diagram illustrating elements or components that may be present in a computer device or system configured to implement a method, process, function or operation in accordance with an embodiment of the invention.

FIG. 4 is a diagram illustrating elements or components that may be present in a computer device or system configured to implement a method, process, function, or operation in accordance with an embodiment of the invention. As noted, in some embodiments, the inventive system and methods may be implemented in the form of an apparatus, system or device that includes a processing element and set of executable instructions. The executable instructions may be part of a software application and arranged into a software architecture.

In general, an embodiment of the invention may be implemented using a set of software instructions that are designed to be executed by a suitably programmed processing element (such as a CPU, microprocessor, processor, GPU, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform. Each application module or sub-module may correspond to a particular function, method, process, or operation that is implemented by the module or sub-module. Such function, method, process, or operation may include those used to implement or represent one or more aspects of the inventive system and methods (including, but not limited to those described with reference to FIGS. 1(a), 1(b), 1(c), 1(d), 2(a), 2(b), and 3).

For example, an application module or sub-module may contain software instructions which when executed cause a system or apparatus to perform one or more of the following operations or functions:

Generate a user interface to enable a user to input a search term or concept C1 (e.g., a topic of interest or variable related to the topic) for initiating a statistical search and/or a semantic search, and/or one or more controls for a search;
note that an example of such a user interface is described with reference to FIGS. 1(b), 1(c) and 1(d);
Determine a concept (C2) that is semantically associated with C1 (this may be an optional feature and based on access to a suitable ontology or reference);
Determine variables ($V_X$) that are semantically associated with C1 and/or C2 by executing a search over a Feature Graph;
Determine variables that are statistically associated with each of the variables $V_X$ by executing a search over a Feature Graph;
Determine a measure or measure of the identified statistical association(s);
Identify datasets that measure each of the variables $V_X$ and/or that demonstrate or support the statistical association(s) of the variables that are statistically associated with each of the variables $V_X$; and
Present to the user a ranking or listing of the identified datasets, with such ranking or listing being subject to filtering by one or more user specified criteria (if desired).

The application modules and/or sub-modules may include any suitable computer-executable code or set of instructions (e.g., as would be executed by a suitably programmed processor, microprocessor, GPU, or CPU), such as computer-executable code corresponding to a programming language. For example, programming language source code may be compiled into computer-executable code. Alternatively, or in addition, the programming language may be an interpreted programming language such as a scripting language.

As described, the system, apparatus, methods, processes, functions, and/or operations for implementing an embodiment of the invention may be wholly or partially implemented in the form of a set of instructions executed by one or more programmed computer processors such as a central processing unit (CPU), GPU or microprocessor. Such processors may be incorporated in an apparatus, server, client or other computing or data processing device operated by, or in communication with, other components of the system.

As an example, FIG. 4 is a diagram illustrating elements or components that may be present in a computer device or system 400 configured to implement a method, process, function, or operation in accordance with an embodiment of the invention. The subsystems shown in FIG. 4 are interconnected via a system bus 402. Additional subsystems include a printer 404, a keyboard 406, a fixed disk 408, and a monitor 410, which is coupled to a display adapter 412. Peripherals and input/output (I/O) devices, which couple to an I/O controller 414, can be connected to the computer system by any number of means known in the art, such as a serial port 416. For example, the serial port 416 or an external interface 418 can be utilized to connect the computer device 400 to further devices and/or systems not shown in FIG. 4 including a wide area network such as the Internet, a mouse input device, and/or a document scanner. The interconnection via the system bus 402 allows one or more electronic processors 420 to communicate with each subsystem and to control the execution of instructions that may be stored in a system memory 422 and/or the fixed disk 408, as well as the exchange of information between subsystems. The system memory 422 and/or the fixed disk 408 may embody a tangible computer-readable medium.

As mentioned, the methods, processes, function or operations described with reference to FIGS. 1-3 may be implemented as a service for one or more users or sets of users. In some embodiments, this service may be provided through the use of a service platform which is operable to provide services for multiple customers, with each customer having a separate account. Such a platform may have an architecture similar to a multi-tenant platform or system, which may be referred to as a SaaS (software-as-a-Service) platform. An example architecture of such a platform is described with reference to FIG. 5.

Figure 5:
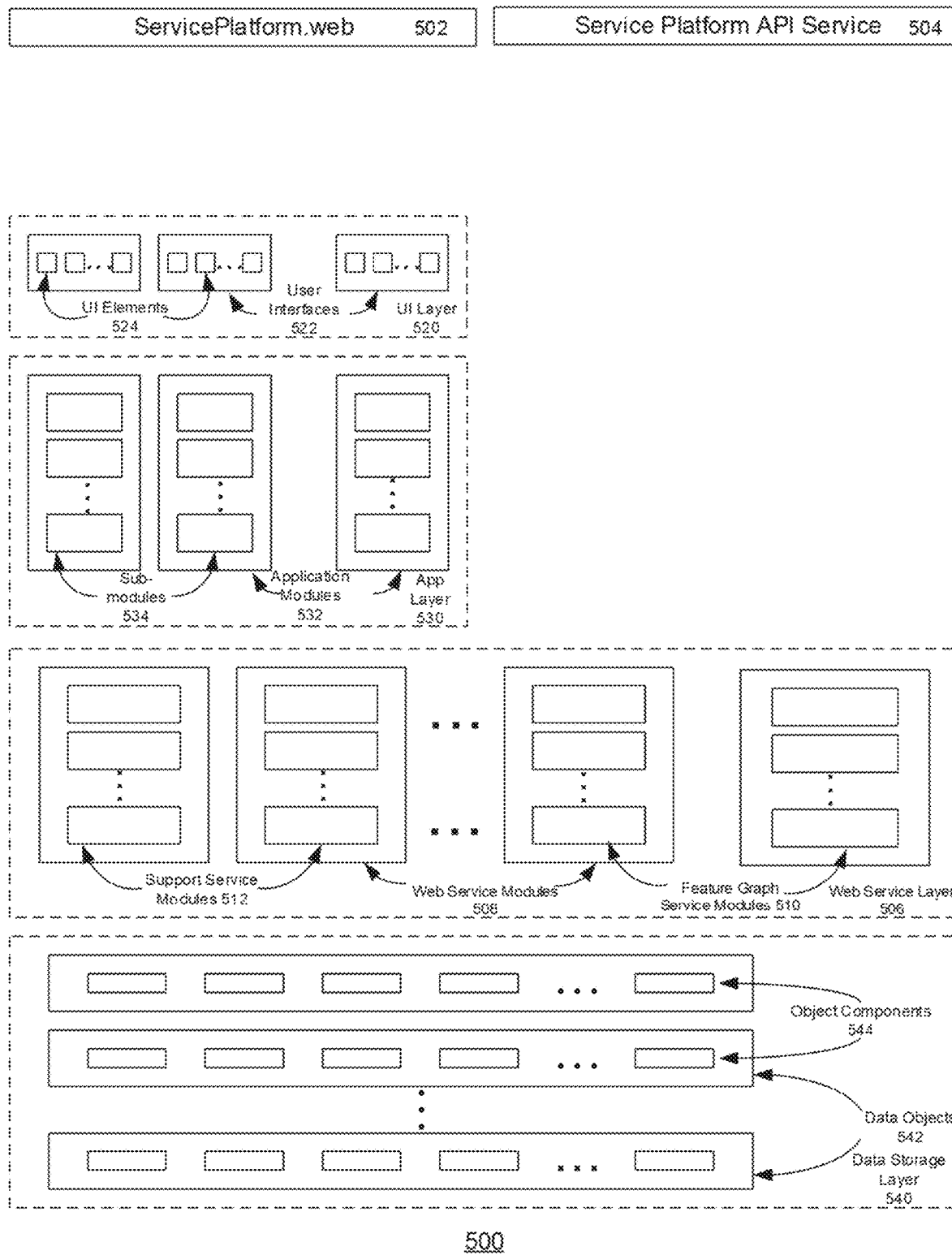
FIG. 5 is a diagram illustrating an example system architecture for a service platform that may be used in implementing an embodiment of the systems and methods described herein.

FIG. 5 is a diagram illustrating an example system architecture 500 for a service platform that may be used in implementing an embodiment of the systems and methods described herein. In some embodiments, a service platform (a multi-tenant or other "cloud-based" system) which provides access to one or more of data, applications, and data processing capabilities includes a website (e.g., ServicePlatform.com), an API (Restful web service), and other support services; the website operation follows a standard MVC (model-view-controller) architecture:

Models—model objects are the parts of the application that implement the logic for the application's data domain. Often, model objects retrieve and store model state in a database. For example, a Bill object might retrieve information from a database, operate on it, and then write updated information back to a Bills table in a SQL Server database;

Views—views are the components that display the application's user interface (UI). Typically, this UI is created from the model data. An example would be an edit view of a Bills table that displays text boxes, drop-down lists, and check boxes based on the current state of a Bill object; and Controllers—controllers are the components that handle user interaction, work with the model, and ultimately select a view to render that displays UI. In an MVC application, the view only displays information; the controller handles and responds to user input and interaction. For example, the controller handles query-string values, and passes these values to the model, which in turn might use these values to query the database.

In one embodiment, the Serviceplatform.com website (element, component, or process 502) provides access to one or more of data, data storage, applications, and data processing capabilities. The applications or data processing capabilities or functionality may include but are not necessarily limited to one or more of the data processing operations described with reference to FIGS. 1-3. The website architecture is based on a standard MVC architecture, and its controller utilizes the API web service (element, component, or process 504) to interact with the service processes and resources (such as models or data) indirectly. The API web service is composed of web service modules (element, component, or process 508) and one or more that execute an embodiment of the process(es) or functionality disclosed herein, that is a Feature Graph construction and search (or other application) service module (element, component, or process 510). When receiving a request, either directly from a service user or from the Serviceplatform.com Controller, the web service module (508) reads data from the input, and launches or instantiates service module (510). Both the Web Service Modules 508 and the Feature Graph Service Modules 510 may be part of a Web Service Layer 506 of the architecture or platform.

The API Service may be implemented in the form of a standard "Restful" web service, where RESTful web services are a way of providing interoperability between computer systems on the Internet. REST-compliant Web services allow requesting systems to access and manipulate textual representations of Web resources using a uniform and pre-defined set of stateless operations.

With reference to FIG. 5, as mentioned, an embodiment of the process or processes described with reference to FIGS. 1-3 may be accessed or utilized via either a service platform website 502 or a service platform API 504. The service platform will include one or more processors or other data processing elements, typically implemented as part of a server. The service platform may be implemented as a set of layers or tiers, including a UI layer 520, an application layer 530, a web services layer 506, and a data storage layer 540. User Interface layer 520 may include one or more user interfaces 522, with each user interface composed of one or more user interface elements 524.

Application layer 530 is typically composed of one or more application modules 532, with each application module composed of one or more sub-modules 534. As described herein, each sub-module may represent executable software instructions or code that when executed by a programmed processor, implements a specific function or process, such as those described with reference to FIGS. 1-3.

Thus, each application module 532 or sub-module 534 may correspond to a particular function, method, process, or operation that is implemented by the module or sub-module (e.g., a function, method, process, or operation related to providing certain functionality to a user of the platform). Such function, method, process, or operation may include those used to implement one or more aspects of the inventive system and methods, such as by:

Generating a user interface to enable a user to input a search term or concept C1 for initiating a statistical search and/or a semantic search, and/or one or more controls for a search;

Determining a concept (C2) that is semantically associated with C1 (this may be an optional feature and based on access to a suitable ontology or reference);

Determining variables ($V_X$) that are semantically associated with C1 and/or C2 by executing a search over a Feature Graph;

Determining variables that are statistically associated with each of the variables $V_X$ by executing a search over a Feature Graph;

Determining a measure or measure of the identified statistical association(s);

Identifying datasets that measure each of the variable $V_X$ and/or that demonstrate or support the statistical association(s) of the variables that are statistically associated with each of the variables $V_X$; and Presenting to the user a ranking or listing of the identified datasets, with such ranking or listing being subject to filtering by one or more user specified criteria (if desired).

Note that in addition to the operations or functions listed, an application module 532 or sub-module 534 may contain computer-executable instructions which when executed by a programmed processor cause a system or apparatus to perform a function related to the operation of the service platform. Such functions may include but are not limited to those related to user registration, user account management, data security between accounts, the allocation of data processing and/or storage capabilities, providing access to data sources other than SystemDB (such as ontologies, reference materials, etc.).

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server may include each application module. Alternatively, different application servers may include different sets of application modules. Such sets may be disjoint or overlapping.

Similarly, Web service layer 506 may be composed of one or more web service modules 508, again with each module including one or more sub-modules (and with each sub-module representing executable instructions that when executed by a programmed processor, implement a specific function or process). For example, web service modules 508 may include modules or sub-modules used to provide support services (as suggested by support service-modules 512) and to provide the functionality associated with the service and processes described herein (as suggested by Feature Graph Service Modules 510). Thus, in some embodiments, modules 510 may include software instructions that, when executed, implement one or more of the functions described with reference to the other Figures (specifically, FIGS. 1-3).

Data storage layer 540 may include one or more data objects 542, with each data object composed of one or more object components 544, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

The architecture of FIG. 5 is an example of a multi-tenant architecture which may be used to provide access to users to various data stores and executable applications or functionality (sometimes referred to as providing Software-as-a-Service (SaaS)). Although FIG. 5 and its accompanying description are focused on a service platform for providing the functionality associated with the processes described with reference to FIGS. 1 through 3, note that a more generalized form of a multi-tenant platform may be used that includes the capability to provide other services or functionality. For example, the service provider may also provide a user with the ability to conduct certain data analysis, billing, account maintenance, scheduling, eCommerce, ERP functionality, CRM functionality, etc.

Note that the example computing environments depicted in the Figures are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed remotely over a network. Further example environments in which an embodiment of the invention may be implemented include devices (including mobile devices), software applications, systems, apparatuses, networks, or other configurable components that may be used by multiple users for data entry, data processing, application execution, data review, etc. and which have user interfaces or user interface components that can be configured to present an interface to a user. Although further examples may reference the example computing environment depicted in the Figures, it will be apparent to one of skill in the art that the examples may be adapted for alternate computing devices, systems, apparatuses, processes, and environments. Note that an embodiment of the inventive methods may be implemented in the form of an application, a sub-routine that is part of a larger application, a "plug-in", an extension to the functionality of a data processing system or platform, or any other suitable form.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

Any of the software components, processes or functions described in this application may be implemented as software code to be executed by a processor using any suitable computer language such as, for example, Python, Java, JavaScript, C++ or Perl using, for example, conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description herein uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as being essential to an embodiment of the invention.

That which is claimed is:

1. A computer-executed method for identifying a relevant dataset for use in training a model related to a topic of interest, comprising:

accessing a source or sources, each source including information regarding a statistical association between a topic of a study described in the source and one or more variables considered in the study;

processing the accessed information from each source to identify the one or more variables considered in the study described in the source, and for each variable, to identify information regarding the statistical association between the variable and the topic of the study;

for at least one of the sources, associating a dataset to at least one of the one or more variables or to the topic of the study described in the source, the dataset including one or more of data used by the study to demonstrate the statistical association or data representing a measure of the one or more variables to which the dataset is associated;

storing the results of processing the accessed source or sources in a database, the stored results including, for each source, a reference to each of the one or more variables, a reference to the topic of the study described in the source, information regarding the statistical association and if applicable, a link or other element to enable access to the associated dataset;

constructing a feature graph based on the stored results of processing the accessed source or sources, the feature graph including a set of nodes and a set of edges, wherein each edge in the set of edges connects a node in the set of nodes to one or more other nodes, and further, wherein each node represents a variable found to be statistically associated with a topic of a study described in a source and each edge represents a statistical association between a node and the topic of the study described in the source or between a first node and a second node;

receiving a search request from a user, the search request specifying the topic of interest;

traversing the feature graph to identify a dataset or datasets associated with one or more variables that are statistically associated with the topic of interest or that are related semantically to one or more variables that are statistically associated with the topic of interest;

filtering and ranking the identified dataset or datasets; and presenting the result of filtering and ranking the identified dataset or datasets to the user.

2. The method of claim 1, wherein the source or sources includes one or more of descriptions of experiments, studies, machine learning models or anecdotal observations.

3. The method of claim 2, wherein processing the source or sources further comprises applying one or more of optical character recognition, image processing, natural language processing or natural language understanding techniques to one or more of the accessed sources.

4. The method of claim 1, wherein storing the results of processing the accessed source or sources in a database further comprises storing the results in a representation of a graph, the graph including a plurality of nodes and a plurality of edges, with each edge connecting a node to another node.

5. The method of claim 4, wherein one or more of the plurality of edges is associated with a measure of the statistical association.

6. The method of claim 1, wherein filtering and ranking the identified dataset or datasets further comprises filtering or ranking based on one or more of (a) Population and Key, (b) Compliance, (c) Interpretability, or (d) Actionability.

7. The method of claim 1, further comprising using one or more of the presented datasets to train the model, wherein the model implements a machine learning technique.

8. The method of claim 7, further comprising using the trained model to make a decision or classification regarding an input to the model.

9. The method of claim 1, wherein processing the accessed source or sources further comprises accessing an ontology or reference to obtain one or more potential topic or concept labels for the one or more variables.

10. The method of claim 1, wherein the information regarding the statistical association is one of an observed association, a measured relationship, or a causal relationship.

11. The method of claim 1, wherein receiving the search request from a user further comprises receiving one or more control parameters for the search from the user, wherein the control parameters include one or more of data, population, quality, methodology, or author.

12. The method of claim 2, wherein accessing a source or sources further comprises accessing information where the topic of a study is the topic of interest.

13. The method of claim 1, further comprising providing a subset of the stored results of processing the accessed source or sources to a user and constructing the feature graph for the user based on the subset of the stored results.

14. The method of claim 13, wherein the subset of the stored results is determined by one or more parameters provided by the user.

15. An electronic form of representing information, comprising:

a data structure representing a graph, the graph including a plurality of nodes and a plurality of edges, each edge connecting a first node to a second node;

a set of values associated with an edge or edges; and at least one link or other element to enable access to a dataset, the link or other element associated with the first node or with the second node;

wherein each node represents a variable found to be statistically associated with a topic of interest and each value associated with an edge represents a measure of a statistical association between a node and the topic of interest, a measure of a statistical association between a first node and a second node, or represents a measure of the confidence in the statistical association.

16. The electronic form of representing information of claim 15, wherein the dataset includes one or more of data used to establish the statistical association between a first variable represented by the first node and a second variable represented by the second node, data representing a measure of the first variable, or data representing a measure of the second variable.

17. The electronic form of representing information of claim 15, wherein the statistical association is one of an observed association, a measured relationship, or a causal relationship.

18. The electronic form of representing information of claim 15, wherein the dataset is associated with one of a description of an experiment, a study, a machine learning model or an anecdotal observation.

19. A data processing system, comprising:

an electronic processor programmed with a set of computer-executable instructions;

a non-transitory electronic storage element storing the set of computer-executable instructions, wherein the set of computer-executable instructions further includes computer-executable instructions, which when executed cause the system to access a source or set of sources, wherein each source includes information regarding a statistical association between a topic of a study described in the source and one or more variables considered in the study;

computer-executable instructions, which when executed cause the system to process the accessed source or sources and to identify for each source the one or more variables considered in the study described in the source, and for each variable, to identify information regarding the statistical association between the variable and the topic of the study;

computer-executable instructions, which when executed cause the system to, for at least one source, associate a dataset to at least one of the one or more variables or to the topic of the study described in the source, the dataset including one or more of data used by the study to demonstrate the statistical association or data representing a measure of the one or more variables to which the dataset is associated; and computer-executable instructions, which when executed cause the system to store the results of processing the accessed source or sources in a database, the stored results including, for each source, a reference to each of the one or more variables, a reference to the topic described in the study, information regarding the statistical association and if applicable, a link or other element to enable access to the dataset.

20. The data processing system of claim 19, further comprising:

computer-executable instructions, which when executed cause the system to construct a feature graph based on the stored results of processing the accessed source or sources, the feature graph including a set of nodes and a set of edges, wherein each edge in the set of edges connects a node in the set of nodes to one or more other nodes, and further, wherein each node represents a variable found to be statistically associated with a topic of a study described in a source and each edge represents a statistical association between a node and the topic of the study described in the source or between a first node and a second node;

computer-executable instructions, which when executed cause the system to receive a search request from a user, the search request specifying a topic of interest;

computer-executable instructions, which when executed cause the system to traverse the feature graph to identify a dataset or datasets associated with one or more variables that are statistically associated with the topic of interest or that are related semantically to one or more variables that are statistically associated with the topic of interest;

computer-executable instructions, which when executed cause the system to filter and rank the identified dataset or datasets; and computer-executable instructions, which when executed cause the system to present the result of filtering and ranking the identified dataset or datasets to the user.

21. The data processing system of claim 19, wherein the source or sources include one or more of descriptions of experiments, studies, machine learning models or anecdotal observations.

22. The data processing system of claim 19, wherein processing the accessed source or sources further comprises applying one or more of optical character recognition, image processing, natural language processing or natural language understanding techniques to one or more of the accessed sources.

23. The data processing system of claim 19, wherein storing the results of processing the accessed source or sources in a database further comprises storing the results in a representation of a graph, the graph including a plurality of nodes and a plurality of edges, with each edge connecting a node to another node.

24. The data processing system of claim 20, further comprising computer-executable instructions, which when executed cause the system to use one or more of the identified data sets to train a model.

25. The data processing system of claim 24, further comprising computer-executable instructions, which when executed cause the system to receive a set of input data for the model, and in response, to generate an output from the model.

26. The data processing system of claim 25, wherein the output is one or more of a classification or a decision.

27. The data processing system of claim 20, further comprising computer-executable instructions, which when executed cause the system to provide a subset of the stored results of processing the accessed source or sources to a user and constructing the feature graph for the user based on the subset of the stored results.

28. The data processing system of claim 27, wherein the subset of the stored results is determined by one or more parameters provided by the user.

* * * * *